(12) United States Patent
Cho et al.

(10) Patent No.: US 9,748,756 B2
(45) Date of Patent: Aug. 29, 2017

(54) CABLE COMBINATION DEVICE

(71) Applicants: HYUNDAI MOTOR COMPANY, Seoul (KR); KYUNGSHIN CO., LTD., Incheon (KR)

(72) Inventors: Ha Young Cho, Suwon-si (KR); Sang Hoon Lee, Bucheon-si (KR); Kwang Hyeon Park, Incheon (KR)

(73) Assignees: HYUNDAI MOTOR COMPANY, Seoul (KR); KYUNGSHIN CO., LTD., Incheon (KR)

( * ) Notice: Subject to any disclaimer, the term of this patent is extended or adjusted under 35 U.S.C. 154(b) by 168 days.

(21) Appl. No.: 14/701,057

(22) Filed: Apr. 30, 2015

(65) Prior Publication Data

US 2016/0111865 A1 Apr. 21, 2016

(30) Foreign Application Priority Data

Oct. 17, 2014 (KR) .................. 10-2014-0140719

(51) Int. Cl.
*H01B 7/08* (2006.01)
*H02G 15/117* (2006.01)
*H02G 3/32* (2006.01)

(52) U.S. Cl.
CPC ............. *H02G 15/117* (2013.01); *H02G 3/32* (2013.01)

(58) Field of Classification Search
CPC .... H02G 15/117; H02G 15/00; H02G 15/103; H02G 15/24; H02G 3/32; H02G 3/30; H02G 3/24; B60R 16/0215; B60R 16/00; B60R 16/0207; H01R 12/61; H01R 12/59; H01R 12/592; H01R 12/594; H01B 7/08; H01B 7/00
USPC ........ 174/117 F, 117 R, 117 FF, 113 R, 68.1, 174/254, 40 CC, 72 A, 135
See application file for complete search history.

(56) References Cited

U.S. PATENT DOCUMENTS

| | | | | |
|---|---|---|---|---|
| 4,065,199 A | * | 12/1977 | Andre | ............... H01B 7/08 |
| | | | | 174/72 A |
| 4,192,965 A | * | 3/1980 | Baum | ............... H02G 3/24 |
| | | | | 174/135 |
| 5,130,499 A | * | 7/1992 | Dijkshoorn | ........ H05K 1/028 |
| | | | | 174/117 F |

(Continued)

FOREIGN PATENT DOCUMENTS

| | | |
|---|---|---|
| JP | 2004-192949 A | 7/2004 |
| JP | 2005-343290 A | 12/2005 |

(Continued)

*Primary Examiner* — Angel R Estrada
(74) *Attorney, Agent, or Firm* — McDermott Will & Emery LLP

(57) ABSTRACT

A cable combination device includes joint terminals configured to be mounted at a joint part formed by jointing a main cable and a branch cable to each other to fix the main cable and the branch cable; a housing configured to have the joint part inserted and mounted therein; and a clip configured to be provided on the housing and fixed to a vehicle body, such that moisture introduction may be prevented by improving water proof performance of the cable, and the cable may be stably mounted in a vehicle by the clip. Therefore, a wiring of the vehicle may be lightened, and at the same time, a cost may be decreased, thereby making it possible to improve marketability.

10 Claims, 6 Drawing Sheets

(56) References Cited

U.S. PATENT DOCUMENTS

| | | | | |
|---|---|---|---|---|
| 5,841,070 | A * | 11/1998 | Takiguchi | B60K 37/00 174/72 A |
| 6,023,022 | A * | 2/2000 | Nakamura | H01R 12/63 174/117 F |
| 6,483,035 | B2 * | 11/2002 | Hasegawa | H01R 12/61 174/117 F |
| 6,575,411 | B1 * | 6/2003 | Serizawa | B60R 16/0215 174/117 F |
| 6,667,441 | B2 * | 12/2003 | Steinhauer | B60R 16/027 174/117 F |
| 7,049,509 | B2 * | 5/2006 | Terada | H02G 3/10 174/135 |
| 7,507,906 | B2 * | 3/2009 | Suzuki | H02G 3/32 174/117 F |
| 7,948,762 | B2 * | 5/2011 | Castillo Garcia | H05K 1/118 174/255 |
| 2011/0007509 | A1 | 1/2011 | Hayes et al. | |
| 2012/0230031 | A1 | 9/2012 | Hayes et al. | |

FOREIGN PATENT DOCUMENTS

| | | |
|---|---|---|
| JP | 2006-32003 A | 2/2006 |
| KR | 2003-0001207 A | 1/2003 |
| KR | 20-2008-0002335 U | 7/2008 |
| KR | 10-2010-0098417 A | 9/2010 |

* cited by examiner

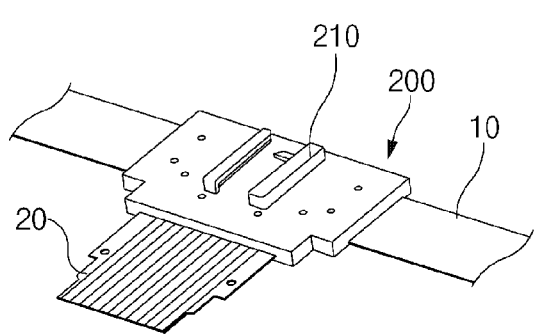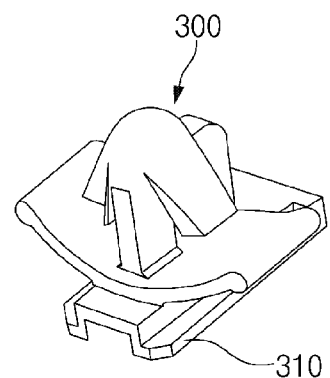
FIG.5A  FIG.5B
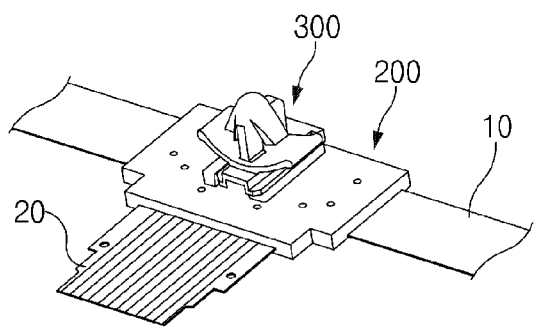
FIG.5C

CABLE COMBINATION DEVICE

CROSS-REFERENCE TO RELATED APPLICATION

This application is based on and claims the benefit of priority to Korean Patent Application No. 10-2014-0140719, filed on Oct. 17, 2014 in the Korean Intellectual Property Office, the disclosure of which is incorporated herein in its entirety by reference.

TECHNICAL FIELD

The present disclosure relates to a cable combination device, and more particularly, to a cable combination device for securing water proof performance of a cable formed of a flexible flat cable (FFC) so as to be applied to a vehicle.

BACKGROUND

In general, a cable is used in order to transfer electric signals and power, and recently, a flexible flat cable (FFC) has also been applied.

However, a flexible flat cable (FFC) according to the related art did not have resistance against contamination materials such as moisture, oils, or the like, introduced from the outside due to poor water proof performance, such that usage convenience was low.

In addition, according to the related art, since a conductor and a combination part were exposed to the outside, at the time of usage for a long period of time, corrosion was generated in the conductor and the combination part, such that marketability may be deteriorated.

RELATED ART DOCUMENT

Patent Document 1: Korean Patent Laid-Open Publication No. 10-2003-0001207

SUMMARY

The present disclosure has been made to solve the above-mentioned problems occurring in the prior art while advantages achieved by the prior art are maintained intact.

An aspect of the present disclosure provides a cable combination device, and more particularly, a cable combination device for securing water proof performance of a cable formed of a flexible flat cable (FFC) so as to be applied to a vehicle.

According to an exemplary embodiment of the present disclosure, a cable combination device includes: joint terminals configured to be mounted at a joint part formed by jointing a main cable and a branch cable to each other to fix the main cable and the branch cable; a housing configured to have the joint part inserted and be mounted therein; and a clip configured to be provided on the housing and be fixed to a vehicle body.

The branch cable may be jointed to the main cable in a vertical direction.

The housing may include: a first hole configured to be formed therein so that the main cable penetrates therethrough; and a second hole configured to be formed therein so that the branch cable is inserted therein.

A plurality of protrusions may be formed in the joint terminal so as to be mounted at the joint part, such that the main cable and the branch cable may be compressed to each other to thereby be electrically connected to each other.

A guide rail may be formed on the housing, and a sliding guide inserted into the guide rail may be provided in the clip.

A catching protrusion may be formed in the housing, and a hook caught by the catching protrusion may be provided in the clip.

The main cable and the branch cable may be flexible flat cables (FFC).

The main cable may transfer electric signals of a vehicle and power to the branch cable.

The branch cable may be jointed to the main cable to transfer the electric signals of the vehicle and power to electric components or sensors of the vehicle.

The housing may be molded by injecting a polyamide material after seating the joint part on a low pressure mold (LPM).

According to another exemplary embodiment of the present disclosure, a cable combination device includes: joint terminals configured to be mounted at a joint part formed by jointing a main cable and a branch cable to each other in a vertical direction to fix and compress the main cable and the branch cable so as to be electrically connected to each other; a housing configured to have the joint part inserted and mounted thereinto and include a guide rail formed on an outer portion thereof; and a clip configured to be mounted on the guide rail of the housing and be fixed to a vehicle body.

BRIEF DESCRIPTION OF THE DRAWINGS

The above and other objects, features and advantages of the present disclosure will be more apparent from the following detailed description taken in conjunction with the accompanying drawings.

FIGS. 5A to 5C are views showing a clip mounted on a housing in the cable combination device according to an exemplary embodiment of the present disclosure.

DETAILED DESCRIPTION

Figure 1:
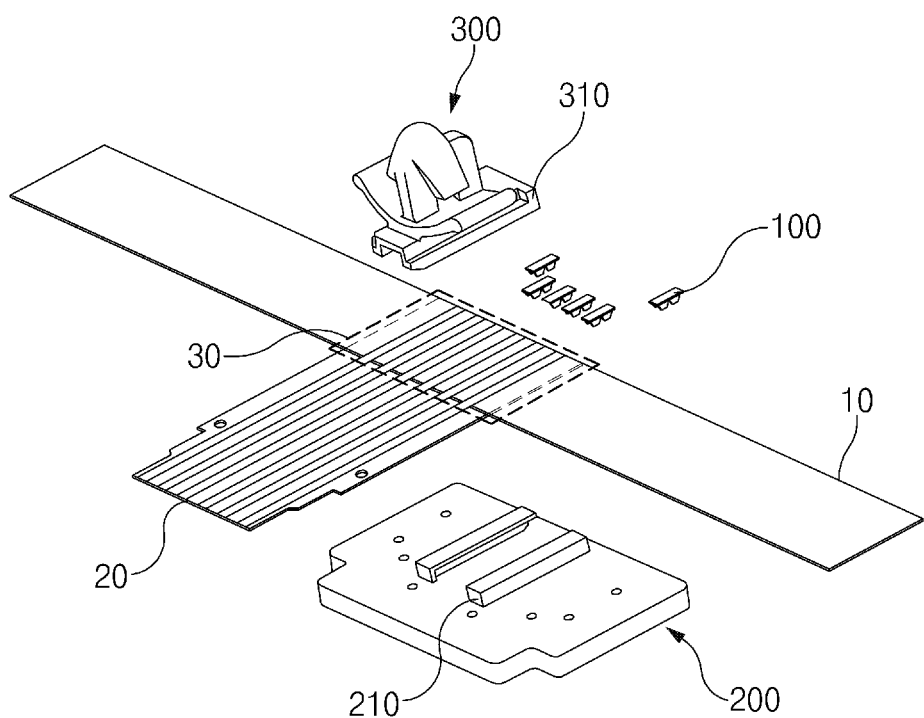
FIG. 1 is an exploded perspective view showing a cable combination device according to an exemplary embodiment of the present disclosure.

An exemplary embodiment of the present disclosure will be described in detail with reference to the accompanying drawings.

As shown in FIGS. 1 to 6C, a cable combination device according to the present disclosure includes joint terminals 100 fixing a joint part 30 of a main cable 10 and a branch cable 20, a housing 200 into which the joint part 30 is inserted, and a clip 300 provided on the housing 200.

First, as shown in FIGS. 1 to 4C, the main cable 10 and the branch cable 20 are jointed to each other to form the joint part 30.

The joint terminal 100 is mounted at the joint part 30 of the main cable 10 and the branch cable 20 to fix the main cable 10 and the branch cable 20.

Here, the branch cable 20 is jointed to the main cable 10 in a vertical direction, such that the main cable 10 and the branch cable 20 are formed in a T-shape.

Meanwhile, the main cable 10 and the branch cable 20 are flexible flat cables (FFC).

In addition, the main cable 10 serves to transfer electric signals of a vehicle and power to the branch cable 20, and the branch cable 20 is jointed to the main cable 10 to transfer the electric signals of the vehicle and power to electric parts or sensors of the vehicle.

Here, preferably, a plurality of protrusions 110 are formed at the joint terminal 100 so as to be mounted at the joint part 30, such that the main cable 10 and the branch cable 20 are compressed to each other to thereby be electrically connected.

As shown in FIGS. 1 to 4C, the joint part 30 of the main cable 10 and the branch cable 20 is inserted and mounted in the housing 200, such that the housing 200 prevents moisture from being introduced into the joint part 30.

Figure 2:
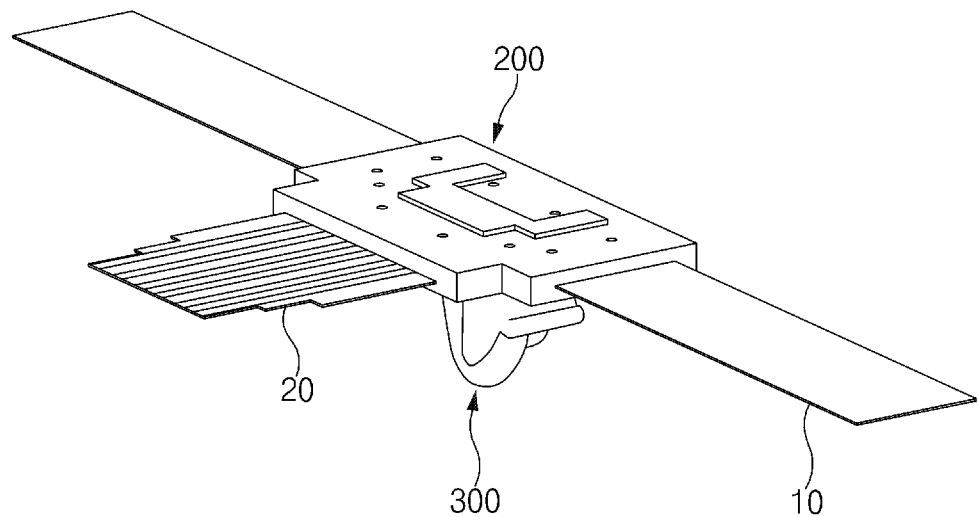
FIG. 2 is a view showing the cable combination device according to an exemplary embodiment of the present disclosure.
Figure 3:
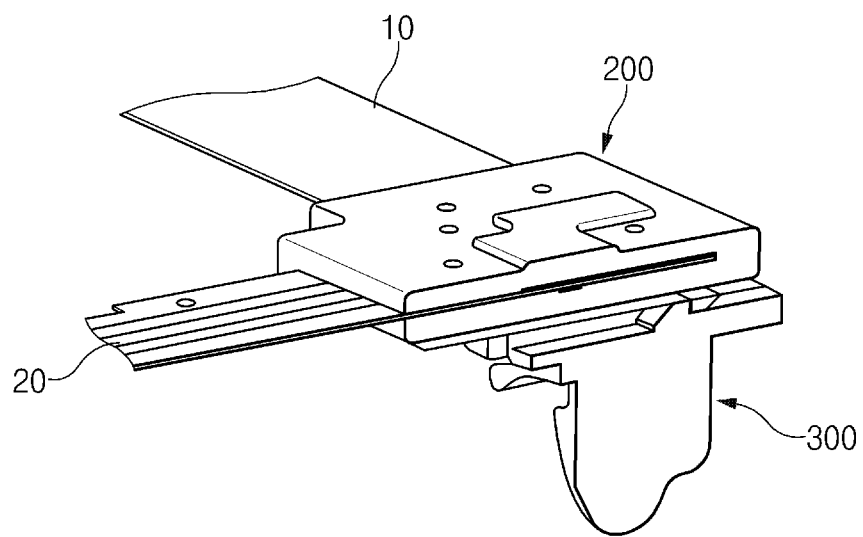
FIG. 3 is a view showing a cut portion of the cable combination device according to an exemplary embodiment of the present disclosure.
Figure 4A:
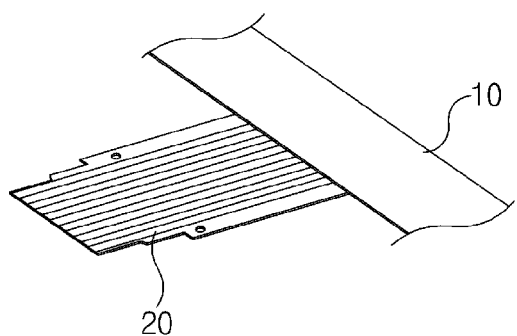
FIGS. 4A to 4C are views showing a joint terminal mounted at a joint part in the cable combination device according to an exemplary embodiment of the present disclosure.
Figure 4B:
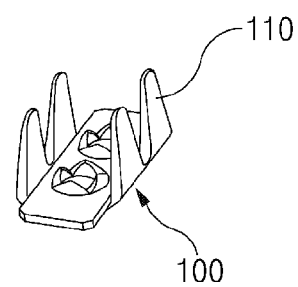
Figure 4C:
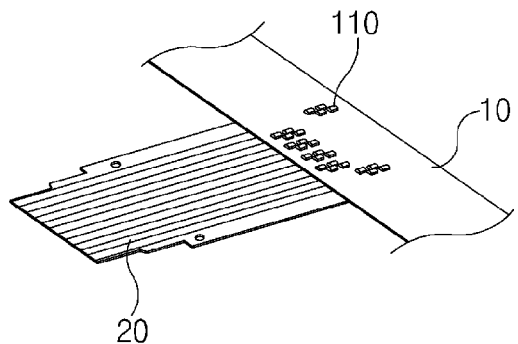
Figure 6A:
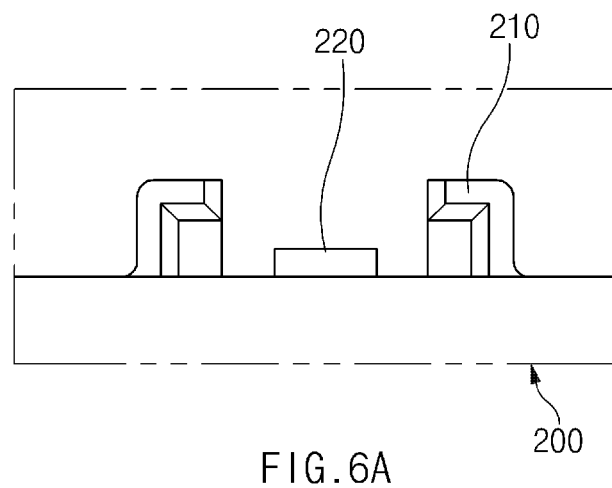
FIGS. 6A to 6C are views showing a combination structure of the housing and clip in the cable combination device according to an exemplary embodiment of the present disclosure.
Figure 6B:
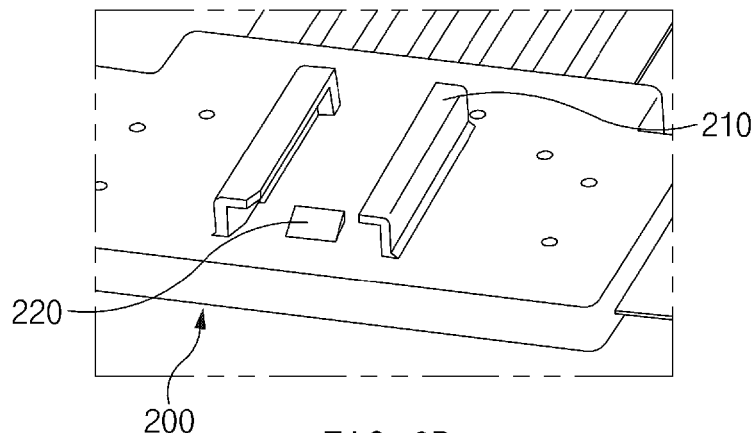
Figure 6C:
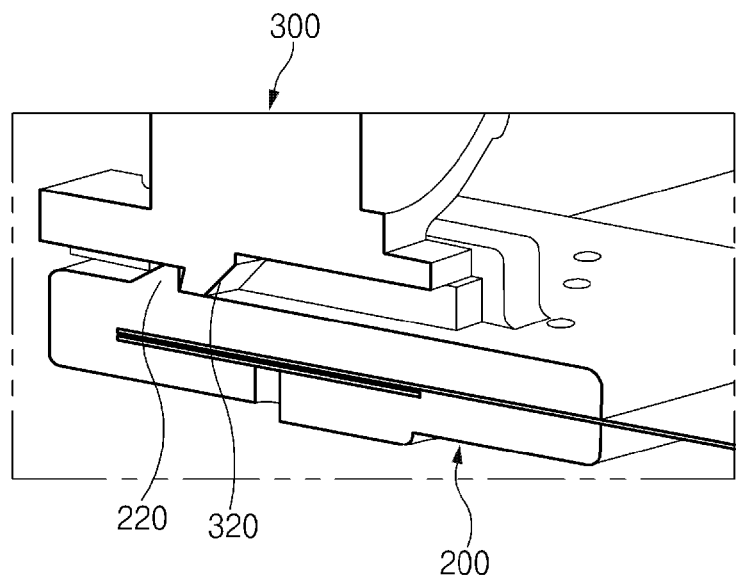

In this case, as shown in FIGS. 2 and 3, a first hole (not shown) through which the main cable 10 penetrates is formed in the housing 200 in a left and right direction, and a second hole (not shown) into which the branch cable 20 is inserted is formed in the front of the housing 200.

In addition, the housing 200 is molded by injecting a polyamide material after seating the joint part 30 on a low pressure mold (LPM), such that water proof performance of the joint part 30 inserted into the housing 200 may be improved.

That is, the housing 200 according to the present disclosure uses the polyamide material, which has characteristics of a liquid having a significantly low viscosity like water at 180 to 230 degrees, such that injection is performed at a low pressure (3 to 35 bars). In addition, a material such as aluminum is used in the mold, and the cooling is performed simultaneously with injection, such that the housing 200 may completely enclose the joint terminal 100 and the joint part 30 without damage depending on the pressure and temperature to the main cable 10 and the branch cable 20, thereby making it possible to protect the joint part 30 from external contamination materials such as water or oil components.

As shown in FIGS. 1 and 5A to 5C, the clip 300 is provided on the housing 200 to fix the housing 200 to a vehicle body.

Meanwhile, as shown in FIGS. 5A to 6C, a guide rail 210 is formed on the housing 200, and a sliding guide 310 inserted into the guide rail 210 is provided in the clip 300, such that the housing 200 and the clip 300 may be easily combined with each other.

In addition, a catching protrusion 220 protrudes from the housing 200, and a hook 320 caught by the catching protrusion 220 is provided in the clip 300, thereby preventing separation of the clip 300 from the housing 200 and improving fixing force with the vehicle body.

As described above, according to the present disclosure, the cable combination device is composed of the joint terminal 100 mounted at the joint part 30 formed by jointing the main cable 10 and the branch cable 20 to each other in the vertical direction to fix and compress the main cable 10 and the branch cable 20 so as to be electrically connected to each other, the housing 200 having the joint part 30 inserted and mounted therein and including the guide rail 210 formed at an outer portion thereof, and the clip 300 mounted on the guide rail 210 of the housing 200 and fixed to the vehicle body, such that moisture introduction may be prevented by improving water proof performance of the cable, and the cable may be stably mounted in the vehicle by the clip 300. Therefore, a wiring of the vehicle may be lightened, and at the same time, a cost may be decreased, thereby making it possible to improve marketability.

As described above, according to the exemplary embodiment of the present disclosure, moisture introduction may be prevented by improving water proof performance of the cable, and the cable may be stably mounted in the vehicle by the clip 300, such that the wiring of the vehicle may be lightened, and at the same time, the cost may be decreased, thereby making it possible to improve marketability.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the claims to be provided below and their equivalents.

What is claimed is:

1. A cable combination device comprising:
    a joint terminal mounted at a joint part formed by jointing a main cable and a branch cable to each other to fix the main cable and the branch cable;
    a housing accommodating the joint part; and
    a clip attached to the housing and fixed to a vehicle body, wherein a catching protrusion is formed on the housing, and
    a hook disposed on the clip is caught by the catching protrusion.

2. The cable combination device according to claim 1, wherein the branch cable is jointed to the main cable in a vertical direction.

3. The cable combination device according to claim 2, wherein the housing includes:
    a first hole through which the main cable penetrates; and
    a second hole which is inserted by the branch cable.

4. The cable combination device according to claim 1, wherein a plurality of protrusions are formed in the joint terminal so as to be mounted at the joint part, such that the main cable and the branch cable are compressed to each other to thereby be electrically connected to each other.

5. The cable combination device according to claim 1, wherein a guide rail is formed on the housing, and
    a sliding guide of the clip is inserted into the guide rail of the housing.

6. The cable combination device according to claim 1, wherein the main cable and the branch cable are flexible flat cables (FFC).

7. The cable combination device according to claim 6, wherein the main cable transfers electric signals of a vehicle and power to the branch cable.

8. The cable combination device according to claim 7, wherein the branch cable is jointed to the main cable to transfer the electric signals of the vehicle and power to electric components or sensors of the vehicle.

9. The cable combination device according to claim 1, wherein the housing is molded by injecting a polyamide material after seating the joint part on a low pressure mold (LPM).

10. A cable combination device comprising:
    joint terminals mounted at a joint part formed by jointing a main cable and a branch cable to each other in a vertical direction to fix and compress the main cable and the branch cable so as to be electrically connected to each other;

a housing accommodating the joint part and including a guide rail formed on an outer portion thereof; and a clip mounted on the guide rail of the housing and fixed to a vehicle body, wherein a catching protrusion is formed on the housing, and a hook disposed on the clip is caught by the catching protrusion.

* * * * *